US011722938B2

(12) United States Patent
Logan et al.

(10) Patent No.: US 11,722,938 B2
(45) Date of Patent: Aug. 8, 2023

(54) SWITCHING CONNECTIONS OVER FREQUENCY BANDS OF A WIRELESS NETWORK

(71) Applicant: Charter Communications Operating, LLC, St. Louis, MO (US)

(72) Inventors: William Kenneth Logan, Overland Park, KS (US); Oliver James Jauncey, Bromley (GB)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 17/461,787

(22) Filed: Aug. 30, 2021

(65) Prior Publication Data

US 2021/0392554 A1 Dec. 16, 2021

Related U.S. Application Data

(63) Continuation of application No. 15/669,182, filed on Aug. 4, 2017, now Pat. No. 11,109,290.

(51) Int. Cl.
*H04W 36/06* (2009.01)
*H04W 48/18* (2009.01)
*H04W 36/32* (2009.01)
*H04W 36/36* (2009.01)
*H04W 36/30* (2009.01)
*H04W 84/12* (2009.01)

(52) U.S. Cl.
CPC ........... *H04W 36/06* (2013.01); *H04W 36/30* (2013.01); *H04W 36/32* (2013.01); *H04W 36/36* (2013.01); *H04W 48/18* (2013.01); *H04W 84/12* (2013.01)

(58) Field of Classification Search
CPC ..... H04W 36/06; H04W 36/30; H04W 36/32; H04W 36/36; H04W 48/18; H04W 84/12
See application file for complete search history.

(56) References Cited

U.S. PATENT DOCUMENTS

| 4,195,351 A | 3/1980 | Barner et al. |
| 4,521,881 A | 6/1985 | Stapleford et al. |

(Continued)

FOREIGN PATENT DOCUMENTS

| CA | 2643806 C | 6/2013 |
| EP | 2900016 A1 | 7/2015 |

(Continued)

OTHER PUBLICATIONS

DOCSIS 3.1: MAC and Upper Layer Protocols Interface Specification, dated May 9, 2017, 838 pages.

(Continued)

*Primary Examiner* — Brian P Cox
(74) *Attorney, Agent, or Firm* — Patent Beach PC

(57) ABSTRACT

A technique performed by a client on a device includes detecting one or more wireless networks in range of the device, where the one or more wireless networks support connection over at least two frequency bands; controlling the device to connect to the one or more wireless networks over at least one of the two frequency bands; and controlling the device to switch connections among different ones of the at least two frequency bands based on levels of service provided by the different ones of the at least two frequency bands.

20 Claims, 4 Drawing Sheets

(56) References Cited

U.S. PATENT DOCUMENTS

| | | |
|---|---|---|
| 4,546,382 A | 10/1985 | McKenna et al. |
| 4,602,279 A | 7/1986 | Freeman |
| 4,930,120 A | 5/1990 | Baxter et al. |
| 5,155,591 A | 10/1992 | Wachob |
| 5,233,423 A | 8/1993 | Jernigan et al. |
| 5,313,454 A | 5/1994 | Bustini et al. |
| 5,341,318 A | 8/1994 | Balkanski et al. |
| 5,361,091 A | 11/1994 | Hoarty et al. |
| 5,477,263 A | 12/1995 | O'Callaghan et al. |
| 5,596,420 A | 1/1997 | Daum |
| 5,600,364 A | 2/1997 | Hendricks et al. |
| 5,610,841 A | 3/1997 | Tanaka et al. |
| RE35,651 E | 11/1997 | Bradley et al. |
| 5,734,380 A | 3/1998 | Adams et al. |
| 5,758,257 A | 5/1998 | Herz et al. |
| 5,774,170 A | 6/1998 | Hite et al. |
| 5,793,410 A | 8/1998 | Rao |
| 5,815,662 A | 9/1998 | Ong |
| 5,861,906 A | 1/1999 | Dunn et al. |
| 5,862,312 A | 1/1999 | Mann et al. |
| 5,873,022 A | 2/1999 | Huizer et al. |
| 5,878,324 A | 3/1999 | Borth et al. |
| 5,886,995 A | 3/1999 | Arsenault et al. |
| 5,914,945 A | 6/1999 | Abu-Amara et al. |
| 5,926,205 A | 7/1999 | Krause et al. |
| 5,926,206 A | 7/1999 | Mihara et al. |
| 5,935,206 A | 8/1999 | Dixon et al. |
| 5,963,202 A | 10/1999 | Polish |
| 5,963,844 A | 10/1999 | Dail |
| 6,002,393 A | 12/1999 | Hite et al. |
| 6,018,359 A | 1/2000 | Kermode et al. |
| 6,020,912 A | 2/2000 | De Lang |
| 6,047,327 A | 4/2000 | Tso et al. |
| 6,065,050 A | 5/2000 | Demoney |
| 6,081,830 A | 6/2000 | Schindler |
| 6,092,178 A | 7/2000 | Jindal et al. |
| 6,105,134 A | 8/2000 | Pinder et al. |
| 6,124,878 A | 9/2000 | Adams et al. |
| 6,134,532 A | 10/2000 | Lazarus et al. |
| 6,157,377 A | 12/2000 | Shah-Nazaroff et al. |
| 6,161,142 A | 12/2000 | Wolfe et al. |
| 6,167,432 A | 12/2000 | Jiang |
| 6,169,728 B1 | 1/2001 | Perreault et al. |
| 6,175,856 B1 | 1/2001 | Riddle |
| 6,182,050 B1 | 1/2001 | Ballard |
| 6,211,869 B1 | 4/2001 | Loveman et al. |
| 6,211,901 B1 | 4/2001 | Imajima et al. |
| 6,216,129 B1 | 4/2001 | Eldering |
| 6,216,152 B1 | 4/2001 | Wong et al. |
| 6,219,710 B1 | 4/2001 | Gray et al. |
| 6,219,840 B1 | 4/2001 | Corrigan et al. |
| 6,240,243 B1 | 5/2001 | Chen et al. |
| 6,240,553 B1 | 5/2001 | Son et al. |
| 6,252,964 B1 | 6/2001 | Wasilewski et al. |
| 6,256,393 B1 | 7/2001 | Safadi et al. |
| 6,275,618 B1 | 8/2001 | Kodama |
| 6,330,609 B1 | 12/2001 | Garofalakis et al. |
| 6,337,715 B1 | 1/2002 | Inagaki et al. |
| 6,345,279 B1 | 2/2002 | Li et al. |
| 6,353,626 B1 | 3/2002 | Sunay et al. |
| 6,378,130 B1 | 4/2002 | Adams |
| 6,434,141 B1 | 8/2002 | Oz et al. |
| 6,434,748 B1 | 8/2002 | Shen et al. |
| 6,446,261 B1 | 9/2002 | Rosser |
| 6,463,508 B1 | 10/2002 | Wolf et al. |
| 6,463,585 B1 | 10/2002 | Hendricks et al. |
| 6,480,667 B1 | 11/2002 | O'Connor |
| 6,487,721 B1 | 11/2002 | Safadi |
| 6,498,783 B1 | 12/2002 | Lin |
| 6,502,139 B1 | 12/2002 | Birk et al. |
| 6,516,412 B2 | 2/2003 | Wasilewski et al. |
| 6,560,578 B2 | 5/2003 | Eldering |
| 6,590,865 B1 | 7/2003 | Ibaraki et al. |
| 6,594,699 B1 | 7/2003 | Sahai et al. |
| 6,598,228 B2 | 7/2003 | Hejna et al. |
| 6,601,237 B1 | 7/2003 | Ten et al. |
| 6,604,138 B1 | 8/2003 | Virine et al. |
| 6,615,039 B1 | 9/2003 | Eldering |
| 6,615,251 B1 | 9/2003 | Klug et al. |
| 6,636,238 B1 | 10/2003 | Amir et al. |
| 6,636,746 B1 | 10/2003 | Hashem et al. |
| 6,642,939 B1 | 11/2003 | Vallone et al. |
| 6,651,103 B1 | 11/2003 | Markowitz et al. |
| 6,671,736 B2 | 12/2003 | Virine et al. |
| 6,687,735 B1 | 2/2004 | Logston et al. |
| 6,700,624 B2 | 3/2004 | Yun |
| 6,718,551 B1 | 4/2004 | Swix et al. |
| 6,725,459 B2 | 4/2004 | Bacon |
| 6,728,269 B1 | 4/2004 | Godwin et al. |
| 6,728,840 B1 | 4/2004 | Shatil et al. |
| 6,738,978 B1 | 5/2004 | Hendricks et al. |
| 6,742,187 B1 | 5/2004 | Vogel |
| 6,745,245 B1 | 6/2004 | Carpenter |
| 6,751,802 B1 | 6/2004 | Huizer et al. |
| 6,763,391 B1 | 7/2004 | Ludtke |
| 6,771,290 B1 | 8/2004 | Hoyle |
| 6,772,435 B1 | 8/2004 | Thexton et al. |
| 6,775,843 B1 | 8/2004 | McDermott |
| 6,799,196 B1 | 9/2004 | Smith |
| 6,839,757 B1 | 1/2005 | Romano et al. |
| 6,842,783 B1 | 1/2005 | Boivie et al. |
| 6,850,691 B1 | 2/2005 | Van Stam et al. |
| 6,859,839 B1 | 2/2005 | Zahorjan et al. |
| 6,868,439 B2 | 3/2005 | Basu et al. |
| 6,891,841 B2 | 5/2005 | Leatherbury et al. |
| 6,898,800 B2 | 5/2005 | Son et al. |
| 6,917,628 B2 | 7/2005 | McKinnin et al. |
| 6,944,166 B1 | 9/2005 | Perinpanathan et al. |
| 6,948,183 B1 | 9/2005 | Peterka |
| 6,961,430 B1 | 11/2005 | Gaske et al. |
| 6,965,724 B1 | 11/2005 | Boccon-Gibod et al. |
| 6,977,691 B1 | 12/2005 | Middleton et al. |
| 6,981,045 B1 | 12/2005 | Brooks |
| 6,982,962 B1 | 1/2006 | Lunsford et al. |
| 6,985,934 B1 | 1/2006 | Armstrong et al. |
| 6,986,156 B1 | 1/2006 | Rodriguez et al. |
| 6,993,787 B1 | 1/2006 | Kamel et al. |
| 7,010,801 B1 | 3/2006 | Jerding et al. |
| 7,017,174 B1 | 3/2006 | Sheedy |
| 7,024,461 B1 | 4/2006 | Janning et al. |
| 7,024,676 B1 | 4/2006 | Klopfenstein |
| 7,027,460 B2 | 4/2006 | Iyer et al. |
| 7,031,348 B1 | 4/2006 | Gazit |
| 7,039,116 B1 | 5/2006 | Zhang et al. |
| 7,039,169 B2 | 5/2006 | Jones |
| 7,039,614 B1 | 5/2006 | Candelore |
| 7,039,938 B2 | 5/2006 | Candelore |
| 7,047,309 B2 | 5/2006 | Baumann et al. |
| 7,058,387 B2 | 6/2006 | Kumar et al. |
| 7,069,573 B1 | 6/2006 | Brooks et al. |
| 7,073,189 B2 | 7/2006 | McElhatten et al. |
| 7,075,945 B2 | 7/2006 | Arsenault et al. |
| 7,085,839 B1 | 8/2006 | Baugher et al. |
| 7,086,077 B2 | 8/2006 | Giammaressi |
| 7,088,910 B2 | 8/2006 | Potrebic et al. |
| 7,089,577 B1 | 8/2006 | Rakib et al. |
| 7,093,272 B1 | 8/2006 | Shah-Nazaroff et al. |
| 7,100,183 B2 | 8/2006 | Kunkel et al. |
| 7,103,906 B1 | 9/2006 | Katz et al. |
| 7,107,462 B2 | 9/2006 | Fransdonk |
| 7,110,457 B1 | 9/2006 | Chen et al. |
| 7,114,173 B2 | 9/2006 | Urdang et al. |
| 7,127,619 B2 | 10/2006 | Unger et al. |
| 7,133,837 B1 | 11/2006 | Barnes, Jr. |
| 7,143,431 B1 | 11/2006 | Eager et al. |
| 7,146,627 B1 | 12/2006 | Ismail et al. |
| 7,152,237 B2 | 12/2006 | Flickinger et al. |
| 7,155,508 B2 | 12/2006 | Sankuratripati et al. |
| 7,174,385 B2 | 2/2007 | Li |
| 7,178,161 B1 | 2/2007 | Fristoe et al. |
| 7,181,010 B2 | 2/2007 | Russ et al. |
| 7,181,760 B1 | 2/2007 | Wallace |
| 7,191,461 B1 | 3/2007 | Arsenault et al. |
| 7,194,752 B1 | 3/2007 | Kenyon et al. |

(56) References Cited

U.S. PATENT DOCUMENTS

| | | |
|---|---|---|
| 7,194,756 B2 | 3/2007 | Addington et al. |
| 7,200,669 B2 | 4/2007 | Cheung et al. |
| 7,200,788 B2 | 4/2007 | Hiraki et al. |
| 7,203,940 B2 | 4/2007 | Barmettler et al. |
| 7,207,055 B1 | 4/2007 | Hendricks et al. |
| 7,216,265 B2 | 5/2007 | Hughes et al. |
| 7,225,164 B1 | 5/2007 | Candelore et al. |
| 7,225,458 B2 | 5/2007 | Klauss et al. |
| 7,228,555 B2 | 6/2007 | Schlack |
| 7,231,132 B1 | 6/2007 | Davenport |
| 7,237,250 B2 | 6/2007 | Kanojia et al. |
| 7,246,150 B1 | 7/2007 | Donoho et al. |
| 7,246,172 B2 | 7/2007 | Yoshiba et al. |
| 7,246,366 B1 | 7/2007 | Addington et al. |
| 7,254,608 B2 | 8/2007 | Yeager et al. |
| 7,257,650 B2 | 8/2007 | Maciesowicz |
| 7,263,275 B2 | 8/2007 | Demas et al. |
| 7,266,198 B2 | 9/2007 | Medvinsky |
| 7,266,611 B2 | 9/2007 | Jabri et al. |
| 7,266,726 B1 | 9/2007 | Ladd et al. |
| 7,283,782 B2 | 10/2007 | Sinnarajah et al. |
| 7,296,074 B2 | 11/2007 | Jagels |
| 7,299,290 B2 | 11/2007 | Karpoff |
| 7,305,691 B2 | 12/2007 | Cristofalo |
| 7,308,415 B2 | 12/2007 | Kimbrel et al. |
| 7,317,728 B2 | 1/2008 | Acharya et al. |
| 7,317,797 B2 | 1/2008 | Vince |
| 7,320,134 B1 | 1/2008 | Tomsen et al. |
| 7,325,073 B2 | 1/2008 | Shao et al. |
| 7,327,692 B2 | 2/2008 | Ain et al. |
| 7,334,044 B1 | 2/2008 | Allen |
| 7,336,886 B2 | 2/2008 | Hsi |
| 7,340,759 B1 | 3/2008 | Rodriguez |
| 7,346,688 B2 | 3/2008 | Allen et al. |
| 7,346,917 B2 | 3/2008 | Gatto et al. |
| 7,352,775 B2 | 4/2008 | Powell |
| 7,355,980 B2 | 4/2008 | Bauer et al. |
| 7,363,371 B2 | 4/2008 | Kirby et al. |
| 7,370,120 B2 | 5/2008 | Kirsch et al. |
| 7,376,386 B2 | 5/2008 | Phillips et al. |
| 7,379,494 B2 | 5/2008 | Raleigh et al. |
| 7,403,618 B2 | 7/2008 | Van Rijnsoever et al. |
| 7,434,245 B1 | 10/2008 | Shiga et al. |
| 7,457,520 B2 | 11/2008 | Rosetti et al. |
| 7,464,179 B2 | 12/2008 | Hodges et al. |
| 7,555,006 B2 | 6/2009 | Wolfe et al. |
| 7,567,565 B2 | 7/2009 | La |
| 7,577,118 B2 | 8/2009 | Haumonte et al. |
| 7,602,820 B2 | 10/2009 | Helms et al. |
| 7,617,516 B2 | 11/2009 | Huslak et al. |
| 7,630,401 B2 | 12/2009 | Iwamura |
| 7,676,142 B1 | 3/2010 | Hung |
| 7,689,995 B1 | 3/2010 | Francis et al. |
| 7,721,313 B2 | 5/2010 | Barrett |
| 7,725,557 B2 | 5/2010 | Klemets et al. |
| 7,733,919 B2 | 6/2010 | Liu et al. |
| 7,757,251 B2 | 7/2010 | Gonder et al. |
| 7,763,360 B2 | 7/2010 | Paul et al. |
| 7,779,097 B2 | 8/2010 | Lamkin et al. |
| 7,783,316 B1 | 8/2010 | Mitchell |
| 7,805,052 B2 | 9/2010 | Nakamura et al. |
| 7,805,741 B2 | 9/2010 | Yeh |
| 7,836,178 B1 | 11/2010 | Bedell et al. |
| 7,844,729 B1 | 11/2010 | Friedman et al. |
| 7,908,626 B2 | 3/2011 | Williamson et al. |
| 7,917,008 B1 | 3/2011 | Lee et al. |
| 7,930,715 B2 | 4/2011 | Hendricks et al. |
| 7,954,131 B2 | 5/2011 | Cholas et al. |
| 8,032,150 B2 | 10/2011 | Cole |
| 8,073,441 B1 | 12/2011 | Unger et al. |
| 8,090,386 B2 | 1/2012 | Alizadeh-Shabdiz et al. |
| 8,122,479 B2 | 2/2012 | Britt |
| 8,170,065 B2 | 5/2012 | Hasek et al. |
| 8,290,351 B2 | 10/2012 | Plotnick et al. |
| 8,291,453 B2 | 10/2012 | Boortz |
| 8,341,242 B2 | 12/2012 | Dillon et al. |
| 8,359,351 B2 | 1/2013 | Istvan et al. |
| 8,365,212 B1 | 1/2013 | Orlowski |
| 8,392,952 B2 | 3/2013 | Carlucci et al. |
| 8,458,125 B1 | 6/2013 | Chong, Jr. et al. |
| 8,468,099 B2 | 6/2013 | Headings et al. |
| 8,484,511 B2 | 7/2013 | Engel et al. |
| 8,516,533 B2 | 8/2013 | Davis et al. |
| 8,520,850 B2 | 8/2013 | Helms et al. |
| 8,538,421 B2 | 9/2013 | Brisebois et al. |
| 8,561,116 B2 | 10/2013 | Hasek |
| 8,621,540 B2 | 12/2013 | Apsangi et al. |
| 8,634,703 B1 | 1/2014 | Barton |
| 8,660,181 B2 | 2/2014 | Streater et al. |
| 8,713,623 B2 | 4/2014 | Brooks |
| 8,726,303 B2 | 5/2014 | Ellis, III |
| 8,799,943 B1 | 8/2014 | Sherwin et al. |
| 8,804,519 B2 | 8/2014 | Svedberg |
| 8,813,124 B2 | 8/2014 | Tidwell et al. |
| 8,813,127 B2 | 8/2014 | Liu et al. |
| 8,826,347 B1 | 9/2014 | Earle |
| 8,843,973 B2 | 9/2014 | Morrison |
| 8,863,164 B1 | 10/2014 | Mick et al. |
| 8,917,977 B2 | 12/2014 | Hamada et al. |
| 8,924,580 B2 | 12/2014 | Begen et al. |
| 8,930,979 B2 | 1/2015 | Tidwell et al. |
| 8,990,869 B2 | 3/2015 | Hasek |
| 8,997,136 B2 | 3/2015 | Brooks et al. |
| 9,066,115 B1 | 6/2015 | Cherry et al. |
| 9,066,138 B1 | 6/2015 | Kraiman et al. |
| 9,071,859 B2 | 6/2015 | Lajoie |
| 9,083,513 B2 | 7/2015 | Helms et al. |
| 9,178,634 B2 | 11/2015 | Tidwell et al. |
| 9,215,423 B2 | 12/2015 | Kimble et al. |
| 9,247,317 B2 | 1/2016 | Shivadas et al. |
| 9,264,508 B2 | 2/2016 | Wolf et al. |
| 9,277,266 B2 | 3/2016 | Riedl et al. |
| 9,510,258 B1 | 11/2016 | Chaudhuri et al. |
| 9,710,469 B2 | 7/2017 | Chen et al. |
| 9,906,940 B2 | 2/2018 | Gupta et al. |
| 10,200,884 B2 | 2/2019 | Tan et al. |
| 10,306,548 B2 | 5/2019 | Logan |
| 10,506,616 B2 | 12/2019 | Logan et al. |
| 10,652,807 B2 | 5/2020 | Logan |
| 11,160,003 B2 | 10/2021 | Logan et al. |
| 2001/0023446 A1 | 9/2001 | Balogh |
| 2002/0046292 A1 | 4/2002 | Tennison et al. |
| 2004/0122952 A1 | 6/2004 | Kistler et al. |
| 2004/0185845 A1 | 9/2004 | Abhishek et al. |
| 2005/0003816 A1 | 1/2005 | Vardoulias et al. |
| 2005/0090275 A1 | 4/2005 | Wang |
| 2005/0101323 A1 | 5/2005 | De Beer |
| 2005/0148332 A1 | 7/2005 | Buckley et al. |
| 2006/0126558 A1* | 6/2006 | Lee ............... H04W 36/14 370/341 |
| 2006/0166677 A1* | 7/2006 | Derakshan ........... H04W 36/14 455/450 |
| 2006/0193287 A1 | 8/2006 | Ooshima et al. |
| 2006/0234705 A1 | 10/2006 | Oommen |
| 2006/0235975 A1 | 10/2006 | Delhumeau et al. |
| 2007/0019670 A1 | 1/2007 | Falardeau |
| 2007/0066304 A1 | 3/2007 | Lee |
| 2007/0255797 A1 | 11/2007 | Dunn et al. |
| 2007/0268877 A1 | 11/2007 | Buckley et al. |
| 2007/0275717 A1 | 11/2007 | Edge et al. |
| 2008/0167033 A1 | 7/2008 | Beckers |
| 2008/0287125 A1 | 11/2008 | Hind et al. |
| 2008/0291686 A1 | 11/2008 | Cull et al. |
| 2009/0024550 A1 | 1/2009 | Wynn et al. |
| 2009/0201908 A1 | 8/2009 | Gidron et al. |
| 2009/0291686 A1 | 11/2009 | Alpert et al. |
| 2010/0014455 A1 | 1/2010 | Oulai et al. |
| 2010/0046466 A1 | 2/2010 | Morimoto et al. |
| 2010/0081433 A1 | 4/2010 | Lee |
| 2010/0149970 A1 | 6/2010 | Miranda et al. |
| 2010/0153335 A1 | 6/2010 | Esteve Balducci et al. |
| 2010/0159948 A1 | 6/2010 | Spivey et al. |
| 2010/0296415 A1 | 11/2010 | Sachs et al. |
| 2011/0029236 A1 | 2/2011 | Zhou et al. |

(56) References Cited

U.S. PATENT DOCUMENTS

| | | | |
|---|---|---|---|
| 2011/0158110 A1* | 6/2011 | Stacey | H04W 36/30 370/252 |
| 2011/0165896 A1* | 7/2011 | Stromberg | G06Q 20/3278 455/466 |
| 2011/0319084 A1 | 12/2011 | Meshkati et al. | |
| 2012/0166618 A1 | 6/2012 | Dahod et al. | |
| 2012/0230305 A1 | 9/2012 | Barbu et al. | |
| 2012/0238287 A1 | 9/2012 | Scherzer | |
| 2013/0044614 A1* | 2/2013 | Aguirre | H04W 28/24 370/252 |
| 2013/0067535 A1 | 3/2013 | Kang et al. | |
| 2013/0262666 A1 | 10/2013 | Balwani | |
| 2013/0295962 A1 | 11/2013 | Manroa et al. | |
| 2013/0331098 A1 | 12/2013 | Balasubramaniyan et al. | |
| 2013/0344857 A1 | 12/2013 | Berionne et al. | |
| 2013/0347073 A1 | 12/2013 | Bryksa et al. | |
| 2014/0071854 A1 | 3/2014 | Xiang et al. | |
| 2014/0071895 A1 | 3/2014 | Bane et al. | |
| 2014/0092731 A1 | 4/2014 | Gupta et al. | |
| 2014/0092755 A1 | 4/2014 | Van De Ven et al. | |
| 2014/0140335 A1 | 5/2014 | Wang et al. | |
| 2014/0141839 A1 | 5/2014 | Larsson | |
| 2014/0153555 A1* | 6/2014 | Gupta | H04L 63/205 370/338 |
| 2014/0274044 A1 | 9/2014 | Lee et al. | |
| 2014/0315536 A1 | 10/2014 | Chow et al. | |
| 2015/0003417 A1 | 1/2015 | Akiyoshi et al. | |
| 2015/0023341 A1 | 1/2015 | Zhao et al. | |
| 2015/0038159 A1 | 2/2015 | Fang et al. | |
| 2015/0050941 A1* | 2/2015 | Sawada | H04W 72/085 455/452.2 |
| 2015/0092553 A1 | 4/2015 | Sirotkin et al. | |
| 2015/0098392 A1 | 4/2015 | Homchaudhuri et al. | |
| 2015/0181405 A1 | 6/2015 | Dua et al. | |
| 2015/0245280 A1 | 8/2015 | Zhou et al. | |
| 2015/0305070 A1 | 10/2015 | Ahmad | |
| 2015/0312833 A1 | 10/2015 | Gresset et al. | |
| 2015/0358757 A1 | 12/2015 | Ford et al. | |
| 2015/0373633 A1 | 12/2015 | Chhabra et al. | |
| 2016/0066251 A1 | 3/2016 | Sirotkin et al. | |
| 2016/0073336 A1 | 3/2016 | Geller | |
| 2016/0150451 A1 | 5/2016 | Barreto De Miranda Sargento et al. | |
| 2016/0227544 A1 | 8/2016 | Katar et al. | |
| 2016/0234674 A1 | 8/2016 | Maguire | |
| 2016/0316410 A1 | 10/2016 | Tan et al. | |
| 2016/0323900 A1* | 11/2016 | De Domenico | H04W 24/02 |
| 2016/0345228 A1 | 11/2016 | Liu et al. | |
| 2016/0381606 A1 | 12/2016 | Lou et al. | |
| 2017/0034775 A1 | 2/2017 | Mandanapu | |
| 2017/0105216 A1* | 4/2017 | Jung | H04W 72/02 |
| 2017/0134944 A1 | 5/2017 | Christian et al. | |
| 2017/0181027 A1 | 6/2017 | Raleigh et al. | |
| 2017/0332300 A1* | 11/2017 | Choi | H04W 88/08 |
| 2018/0035365 A1 | 2/2018 | Koratekere Honnappa et al. | |
| 2018/0061373 A1 | 3/2018 | Sato et al. | |
| 2018/0083795 A1 | 3/2018 | Zehler et al. | |
| 2018/0176792 A1 | 6/2018 | Egner et al. | |
| 2018/0184330 A1 | 6/2018 | Egner et al. | |
| 2019/0027625 A1 | 1/2019 | Stutterheim et al. | |
| 2019/0045517 A1 | 2/2019 | Logan et al. | |

FOREIGN PATENT DOCUMENTS

| | | |
|---|---|---|
| EP | 2974473 A1 | 1/2016 |
| GB | 2405567 A | 3/2005 |
| JP | 2004054930 A | 2/2004 |
| JP | 2005130087 A | 5/2005 |
| JP | 2007060178 A | 3/2007 |
| JP | 2007324814 A | 12/2007 |
| JP | 2009519678 A | 5/2009 |
| JP | 2012515473 A | 7/2012 |
| JP | 2012527829 A | 11/2012 |
| JP | 2014068151 A | 4/2014 |
| JP | 2014526849 A | 10/2014 |
| JP | 2016006926 A | 1/2016 |
| JP | 2016517669 A | 6/2016 |
| JP | 2016208371 A | 12/2016 |
| WO | WO-0110125 A1 | 2/2001 |
| WO | WO-0176236 A1 | 10/2001 |
| WO | WO-0191474 A2 | 11/2001 |
| WO | WO-0219581 A1 | 3/2002 |
| WO | WO-2004008693 A1 | 1/2004 |
| WO | WO-2011016397 A1 | 2/2011 |
| WO | WO-2013058684 A1 | 4/2013 |
| WO | WO-2016095974 A1 | 6/2016 |
| WO | WO-2019027625 A1 | 2/2019 |

OTHER PUBLICATIONS

DOCSIS 3.1: Physical Layer Specification, dated May 9, 2017, 249 pages.
Efficient Delivery of Streaming Interactive Video (Multimedia, Video on Demand), Dey, J.; vol. 59-02b, University of Massachusetts, 1998 discloses video delivery systems that deliver data from a server to clients across a high speed network.
Griffith D.W., et al., "Resource Planning and Bandwidth Allocation in Hybrid Fiber-Coax Residential Networks," National Institute of Standards and Technology (NIST), Oct. 1, 2005,10 pages.
"Internet Protocol, DARPA Internet Program, Protocol Specification", IETF RCF 791, Sep. 1981, 50 pages.
Kanouff, Communications Technology: Next-Generation Bandwidth Management—The Evolution of the Anything-to-Anywhere Network, 8 pages, Apr. 1, 2004.
Motorola DOCSIS Cable Module DCM 2000 specifications, 4 pages, copyright 2001.
OpenVision Session Resource Manager—Open Standards-Based Solution Optimizes Network Resources by Dynamically Assigning Bandwidth in the Delivery of Digital Services article, 2 pages, (copyright 2006), (http://www.imake.com/hopenvision).
OpenVision Session Resource Manager features and information, 2 pages, (http://www.imake.com/hopenvision).
SCTE 130-1 2008 Digital Program Insertion—Advertising Systems Interfaces standards.
SCTE 130-1 2013. Part 1: Digital Program Insertion—Advertising Systems Interfaces, Part 1—Advertising Systems Overview, 20 pages.
SCTE 130-10 2013: Digital Program Insertion—Advertising Systems Interfaces Part 10—Stream Restriction Data Model.
CableLabs Asset Distribution Interface (ADI) Specification, Version 1 1, MD-SP-ADI1.103-040107, Jan. 7, 2004. pp. 1-26.
Cisco Intelligent Network Architecture for Digital Video—SCTE Cable-Tec Expo 2004 information page, Orange County Convention Center, Jun. 2004, 24 pages.
Deering, S., et al., "Internet Protocol, Version 6 (IPv6) Specification," Internet Engineering Task Force (IETF) RFC 2460, Dec. 1998, 39 pages.
DOCSIS 1.0: Cable Modem to Customer Premise Equipment Interface Specification, dated Nov. 3, 2008, 64 pages.
DOCSIS 1.1: Operations Support System Interface Specification, dated Sep. 6, 2005, 242 pages.
DOCSIS 1.1: Radio Frequency Interface Specification, dated Sep. 6, 2005, 436 pages.
DOCSIS 2.0: Radio Frequency Interface Specification, dated Apr. 21, 2009, 499 pages.
DOCSIS 3.0: Cable Modem to CPE Interface Specification, dated May 9, 2017, 19 pages.
DOCSIS 3.0: MAC and Upper Layer Protocols Interface Specification, dated Jan. 10, 2017, 795 pages.
DOCSIS 3.0: Operations Support System Interface Specification, dated Jan. 10, 2017, 547 pages.
DOCSIS 3.0: Physical Layer Specification, dated Jan. 10, 2017, 184 pages.
DOCSIS 3.1: Cable Modem Operations Support System Interface Specification, dated May 9, 2017, 308 pages.
DOCSIS 3.1: CCAP Operations Support System Interface Specification, dated May 9, 2017, 703 pages.

(56) References Cited

OTHER PUBLICATIONS

SCTE 130-2 2008a: Digital Program Insertion—Advertising Systems Interfaces Part 2—Core Data Elements.
SCTE 130-2 2014 Digital Program Insertion—Advertising Systems Interfaces standards.
SCTE 130-3 2013: Digital Program Insertion—Advertising Systems Interfaces Part 3—Ad Management Service Interfaces.
SCTE 130-4 2009: Digital Program Insertion—Advertising Systems Interfaces Part 4—Content Information Service.
SCTE 130-5 2010: Digital Program Insertion—Advertising Systems Interfaces Part 5—Placement Opportunity Information Service.
SCTE 130-6 2010: Digital Program Insertion—Advertising Systems Interfaces Part 6—Subscriber Information Service.
SCTE 130-7 2009: Digital Program Insertion—Advertising Systems Interfaces Part 7—Message Transport.
SCTE 130-8 2010a: Digital Program Insertion Advertising Systems Interfaces Part 8—General Information Service.
SCTE 130-9 2014: Recommended Practices for SCTE 130 Digital Program Insertion—Advertising Systems Interfaces.
SCTE130-3 2010: Digital Program Insertion—Advertising Systems Interfaces Part 3—Ad Management Service Interface.
Wikipedia, Digital Video Recorder, obtained from the Internet Nov. 11, 2014.

* cited by examiner

SWITCHING CONNECTIONS OVER FREQUENCY BANDS OF A WIRELESS NETWORK

PRIORITY

This application is a continuation of, and claims priority to, co-owned and co-pending U.S. patent application Ser. No. 15/669,182 of the same title filed on Aug. 4, 2017, and issuing as U.S. Pat. No. 11,109,290 on Aug. 31, 2021, which is incorporated herein by reference in its entirety.

TECHNICAL FIELD

This specification relates generally switching connections over frequency bands of a wireless network.

BACKGROUND

A wireless network, such as a WiFi network, may permit a mobile device to connect to the wireless network over different frequency bands. In an example, a WiFi network may permit a device to connect over a 2.4 gigahertz (GHz) frequency band, over a 5 GHz frequency band, and/or over a 60 GHz frequency band.

SUMMARY

An example method is performed using a client on a device. The example method includes operations comprising: detecting one or more wireless networks in range of the device, where the one or more wireless networks support connection over at least two frequency bands; controlling the device to connect to the one or more wireless networks over at least one of the two frequency bands; and controlling the device to switch connections among different ones of the at least two frequency bands based on levels of service provided by the different ones of the at least two frequency bands. The example method may include one or more of the following features, either alone or in combination.

The connections may be switched in real-time based also on one or more attributes relating to one or more of: the device, the one or more wireless networks, or the at least two frequency bands. The one or more attributes may comprise at least one of network signal strength, device network preference, device location, or physical barriers within a range of the wireless network.

The device may be controlled to switch connections among ones of the at least two frequency bands to maintain at least a target level of service over the one or more wireless networks. The device may be controlled to switch connections among ones of the at least two frequency bands based on a location of the device relative to a network access point.

At least one of the two frequency bands may include a first frequency band. The device may be controlled to switch connections among ones of the at least two frequency bands by performing operations comprising: severing a connection over the first frequency band; connecting to the wireless network over a second frequency band among the at least two frequency bands; and eventually again connecting to the wireless network over the first frequency band. Controlling the device to connect to the one or more wireless networks may be performed at entry into range of the wireless network. Connecting over the second frequency band may be performed within a threshold distance from an access point of the wireless network. Eventually again connecting over the first frequency band may be performed at exiting from the range of the wireless network.

The example method may comprise configuring the client based on at least one policy that is applicable to a class of devices or that is unique to the device. The least one policy may comprise data for influencing connection between the device and the one or more wireless networks over the at least two frequency bands.

The example method may comprise ranking the one or more wireless networks and the at least two frequency bands. The device may be controlled to switch connections among ones of the at least two frequency bands based on the ranking. The device may be controlled to switch connections among ones of the at least two frequency bands by disconnecting the device over a first frequency band among the at least two frequency bands and connecting the device over a second frequency band among the at least two frequency bands. The connecting and disconnecting may be performed in sequence in real-time.

The levels of service may be based on signal strengths over the at least two frequency bands. The example method may comprise determining signal strength over each of the at least two frequency bands. Controlling the device to switch connections among different ones of the at least two frequency bands may comprise switching connections based on signal strength over the at least two frequency bands.

The levels of service may be based on signal-to-noise ratios over the at least two frequency bands. The method may comprise determining a signal-to-noise ratio over each of the at least two frequency bands. Controlling the device to switch connections among different ones of the at least two frequency bands may comprise switching connections based on signal-to-noise ratios over the at least two frequency bands.

The levels of service may comprise at least a minimum throughput.

Any two or more of the features described in this specification, including in this summary section, may be combined to form implementations not specifically described in this specification.

All or part of the processes, methods, systems, and techniques described herein may be implemented as a computer program product that includes instructions that are stored on one or more non-transitory machine-readable storage media, and that are executable on one or more processing devices. Examples of non-transitory machine-readable storage media include, e.g., read-only memory, an optical disk drive, memory disk drive, random access memory, and the like. All or part of the processes, methods, systems, and techniques described herein may be implemented as an apparatus, method, or system that includes one or more processing devices and memory storing instructions that are executable by the one or more processing devices to perform the stated operations.

The details of one or more implementations are set forth in the accompanying drawings and the description below. Other features and advantages will be apparent from the description and drawings, and from the claims.

DESCRIPTION OF THE DRAWINGS

Like reference numerals in different figures indicate like elements.

DETAILED DESCRIPTION

Described herein are example processes, which may be performed by a client on a mobile device ("device"), that enable switching connections over different frequency bands of one or more wireless networks. The example processes are rooted in computer technology in order to overcome a problem specifically arising in the realm of computer networks. Specifically, movement of a device can result in changes to network performance. For example, as a device moves, the device goes into, and out of, ranges of different wireless networks. As a network's signal wanes due to this movement, the performance of the device over the network may suffer. Factors other than movement may also impact device performance on a network. For example, the number of users on a network can reduce the available bandwidth for the device, which can reduce throughput and increase latency. Obstacles in the path of network signals may affect their strength, and so forth.

Figure 1:
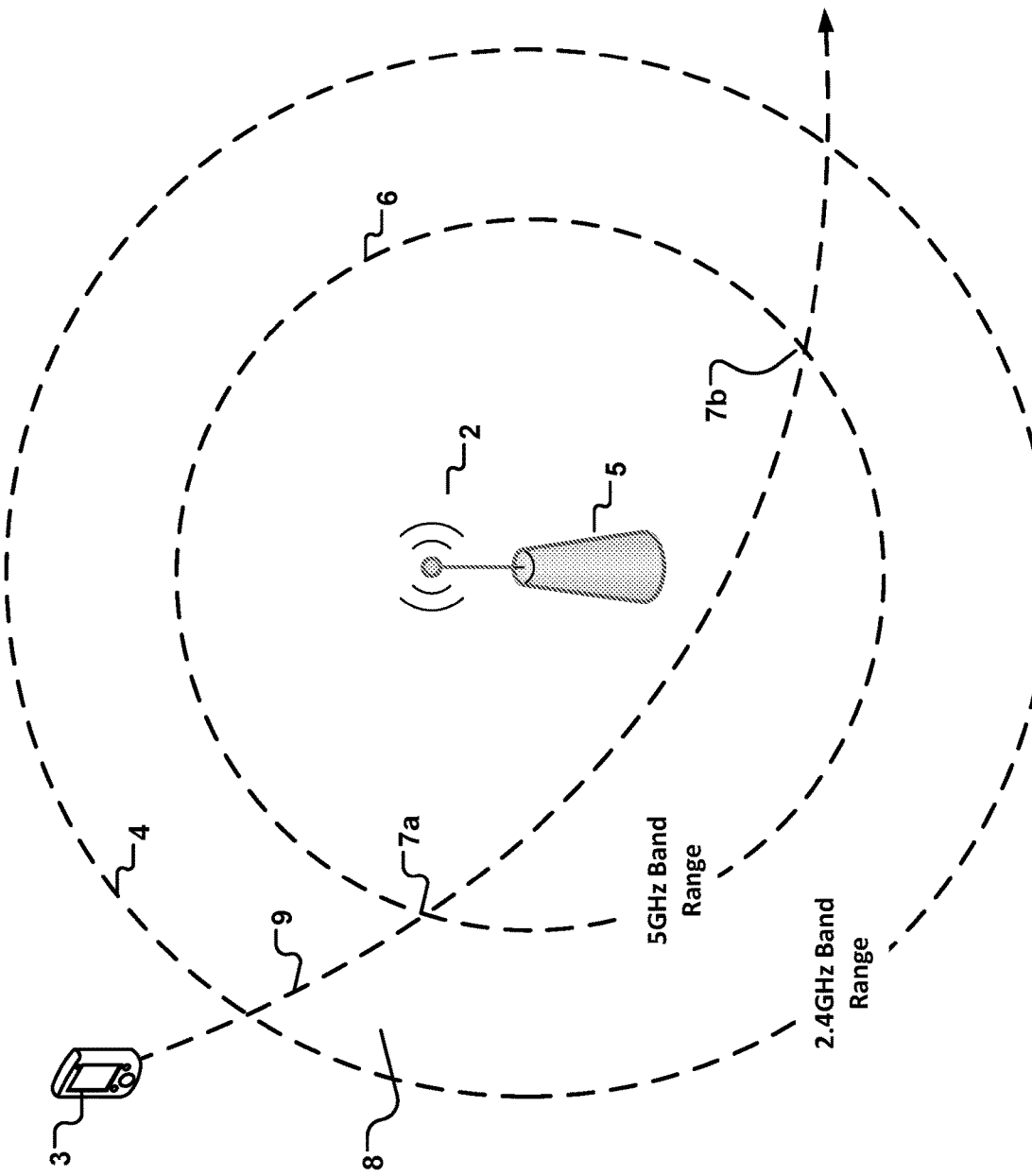
FIG. 1 is a block diagram showing an example where frequency band connections are switched during movement through a single wireless network.

Referring to FIG. 1, as explained, a wireless network, such as a WiFi network, may permit a mobile device to connect to the wireless network over different frequency bands. In an example, a WiFi network 2 may permit a mobile device 3 to connect over a 2.4 gigahertz (GHz) frequency band ("band") or over a 5 GHz band. A 60 GHz band may also be available in some networks, but is not considered for the purposes of this example. In some environments, the 2.4 GHz band WiFi signal reaches a range 4 of about 150 to 200 meters from the signal's origin point 5, which may be a network access point. In some environments, the 5 GHz band WiFi signal reaches a range 6 of about 50 to 80 meters from the network access point 5. As shown, an example mobile device 3 moves in the direction of arrow 9 into an area 8 covered by wireless network 2. If mobile device 3 is configured to connect over the 2.4 GHz band only, mobile device 3 may connect throughout the entire range 4 of the wireless network; however, the mobile device will not be able to take advantage of the higher throughput available on the 5 GHz band. Conversely, if mobile device is configured to connect over the 5 GHz band only, the mobile device will be able to take advantage of the 5 GHz higher throughput, but will be unable to take advantage of the full range 4 of the wireless network, e.g., the device will be limited to range 6 provided by the 5 GHz signal instead of range 4 provided by the 2.4 GHz signal.

To address these problems, the mobile device may be controlled to switch connection over different frequency bands supported by the wireless network. For example, the device may be configured to scan for the wireless network, and the different frequency bands supported by the wireless network. As shown in FIG. 1, mobile device 3 moves into the area 8 covered by wireless network 2, and first encounters the 2.4 GHz frequency band, since the 2.4 GHz band has a greater range 4 than the 5 GHz band. Accordingly, device 3 is configured to connect first to wireless network 2 over the 2.4 GHz band. As the device travels through area 8, e.g., along the path represented by arrow 9, at point 7a the device will eventually encounter the 5 GHz band. After encountering the 5 GHz band, the device is controlled to switch the frequency band over which it connects to the network. In this example, the device is controlled to switch its connection to network 2 over the 5 GHz band. As a result, while in-range 6 of the 5 GHz band, the device is able to take advantage of the higher level of service provided by the 5 GHz band. For example, the 5 GHz band may provide greater throughput than the 2.4 GHz band, resulting in better device performance in the 5 GHz range 6. As device 3 continues to travel, at point 7b, device 3 eventually exits the 5 GHz range 6, and re-enters the 2.4 GHz range 4. Accordingly, the device is configured to switch its connection from the 5 GHz band back to the 2.4 GHz band. As a result, the device is able to maintain its connection longer due to the extended 2.4 GHz range 4, albeit at a potentially lower level of service (e.g., lower throughput) provided by the 2.4 GHz band.

By switching connections among different frequency bands, mobile device 3 is able to take advantage of different features of the different frequency bands and thereby improve (e.g., optimize) its network performance. In this example, performance is optimized for both distance and throughput. That is, in this example, for instance, switching frequency bands allows the device to maintain a wireless network connection over a maximum range 4, while still taking advantage of the greater throughput provided by the more limited-range 5 GHz band. In other examples, considerations other than range and performance may be used to dictate whether, when, and under what circumstances frequency bands are switched.

In some examples, the wireless networks include WiFi networks; however, the processes described herein ("the processes") for switching connections among frequency bands may be used with any appropriate type of wireless network, examples of which are provided below. In some implementations, the example processes are performed, at least in part, on a client on the mobile device after the client has been decided to connect to a wireless network and while the device is connected to the wireless network. The example processes may include detecting one or more wireless networks in range of the device that support device connection over at least two frequency bands. The detection operation may be performed as part of a process used to determine whether to connect to the wireless network or it may be a separate operation performed as part of a process for switching connections among frequency bands. In some implementations, the availability of certain frequency bands for connection may be a factor in determining whether the mobile device decides to attempt connection to the wireless network.

The operations for switching connections among frequency bands may also include controlling the device to connect to the one or more wireless networks over at least one of the two frequency bands. The device may be controlled to first connect over a frequency band having a greatest range, such as the 2.4 GHz band in the prior example. Thereafter, the device may be controlled to switch connections among different ones of the at least two frequency bands based on levels of service provided by those frequency bands. In the above example, within the range of the 2.4 GHz band, the device encounters a 5 GHz band. The 5 GHz band provides more data throughput than the 2.4 GHz band. Therefore, the device switches its connection from the 2.4 GHz band to the 5 GHz band, and maintains that connection while the device is in-range of the 5 GHz band. When the device exits the 5 GHz band, it reconnects to the 2.4 GHz band, resulting in a longer-duration connection than would be possible if the device were configured only for the 5 GHz band.

The example processes may be performed, in whole or in part, by the client, which is stored in memory on the mobile device. The client may include executable instructions to implement the processes described herein for selecting, and switching among, frequency bands. In some implementations, the client runs continuously in the background during device operation. The example processes may be implemented, at least in part, also using one or more servers ("servers"). The servers may include one or more software modules comprised of executable instructions to configure the mobile device to implement the processes. For example, in some implementations, the servers may store policies that contain rules or other information for controlling circumstances under which the device switches among different frequency bands of a wireless network.

The policies may be loaded onto the servers by an owner of the mobile device or by any other appropriate party having an interest in the operation of the mobile device. For example, an internet service provider (ISP), a mobile network provider, or other party may load the policies on the servers. A Web interface, application programming interface (API), or other appropriate interface may be used to load the policies onto the server. The mobile device may synchronize ("synch") with the server intermittently, periodically, or at any appropriate time to receive, from the server, an operational policy ("policy") that is designated for the mobile device. Synching may be user-initiated or it may be performed automatically based on time or some operational trigger. Either the mobile device or the server may initiate communication. The mobile device and the server may communicate with each other over the Internet or over any other appropriate network or networks. In some implementations, the server may push a policy to the mobile device, or the mobile device may pull a policy from the server. In some examples, the policies on the server may be indexed by telephone number, user name, address, device identifier, or other appropriate indicia. The server may recognize the mobile device based on information such as this, and access appropriate policies for the mobile device.

An example policy for a mobile device may specify, among other things, to control the mobile device to connect over, to switch to, or to steer between, frequency bands based solely on the connection frequency. For example, a policy may specify to connect over, to switch, or steer, to a higher or highest frequency band that is encountered and is in-range. An example policy for a mobile device may specify, among other things, to control the mobile device to connect over a frequency band based on the frequency and also based on network attributes, device attributes, or both network and device attributes. For example, a policy may specify to control the device to connect over, to switch to, or to steer to, a higher or highest frequency band based also on attributes that affect the levels of service provided on the different frequency bands. For example, a policy may specify to control the device to connect over, to switch to, or to steer to, a higher or highest frequency band so long as the higher or highest frequency band results in better network service in at least one respect based on the attributes considered.

Examples of attributes that may be considered or taken into account include, but are not limited to, ranges of coverage of the frequency bands, throughput attainable on the frequency bands, the number of channels in each frequency band, the device's ability or inability to connect over the certain frequency bands, quality of service (QoS) achievable over the different frequency bands, network latency over the different frequency bands, network security on different frequency bands, a preference of the device for particular frequency band(s), the number of users on a particular frequency band, the signal strength of the frequency bands, signal-to-noise ratio (SNR) associated with the frequency bands, and so forth. This list is not exhaustive, and any appropriate attributes may be taken into account in determining whether to connect over a particular frequency band. Other attributes not specified herein may be used instead of, or in addition to, those specified. In addition, attributes other than device and network attributes may be factored into decisions about whether to connect to a wireless network over a frequency band. For example, if the device moves into an area having large amounts of radio frequency (RF) background signals, other radiation, or physical obstacles, these may affect network connection over some frequency bands more than over others. Accordingly, the client may be configured to evaluate whether a frequency band is appropriate for connection in a particular area, and determine whether connection over that frequency band is appropriate given the characteristics of the area. Information about an area may be obtained from a policy or from any other appropriate source, such as the Internet.

In some implementations, a policy may control the client to switch among different frequency bands in order to maintain some minimum level of service, such as throughput. In some implementations, a policy may control the client to switch among different frequency bands in order to take advantage of different network attributes. In the example provided previously, a policy may include taking advantage of the greater range of the 2.4 GHz band and of the higher throughput of the 5 GHz band. In this regard, a 60 GHz WiFi signal has a shorter range than the 5 GHz band, but a greater throughput than the 5 GHz range. Accordingly, a policy may be configured to steer a mobile device first to the 2.4 GHz band, then to the 5 GHz band when it comes in-range, then to the 60 GHz band when it comes in-range, then back to the 5 GHz band as the device exits the 60 GHz band range, and then back to the 2.4 GHz band as the device exits the 5 GHz band range.

In some implementations, one or more policies may instruct the client to cause the device to switch between different frequency bands of different wireless networks. For example, the device may be controlled to first connect over a frequency band of a first wireless network, such as the 2.4 GHz band in the prior example. Thereafter, the device may be controlled to switch connections to connect over a 5 GHz band of a second, different wireless network when that band is encountered. As the device goes out of range of the second wireless network, the device may be controlled to reconnect over the 2.4 GHz band in the first wireless network. Switching such as this may be implemented in cases in cases where the device is connected to multiple wireless networks concurrently, or in cases where the device does not maintain concurrent connections to multiple wireless networks.

The policies described above are examples. In general a policy may set any appropriate criteria for selecting and switching among different frequency bands of a single wireless network or of different wireless networks.

Figure 2:
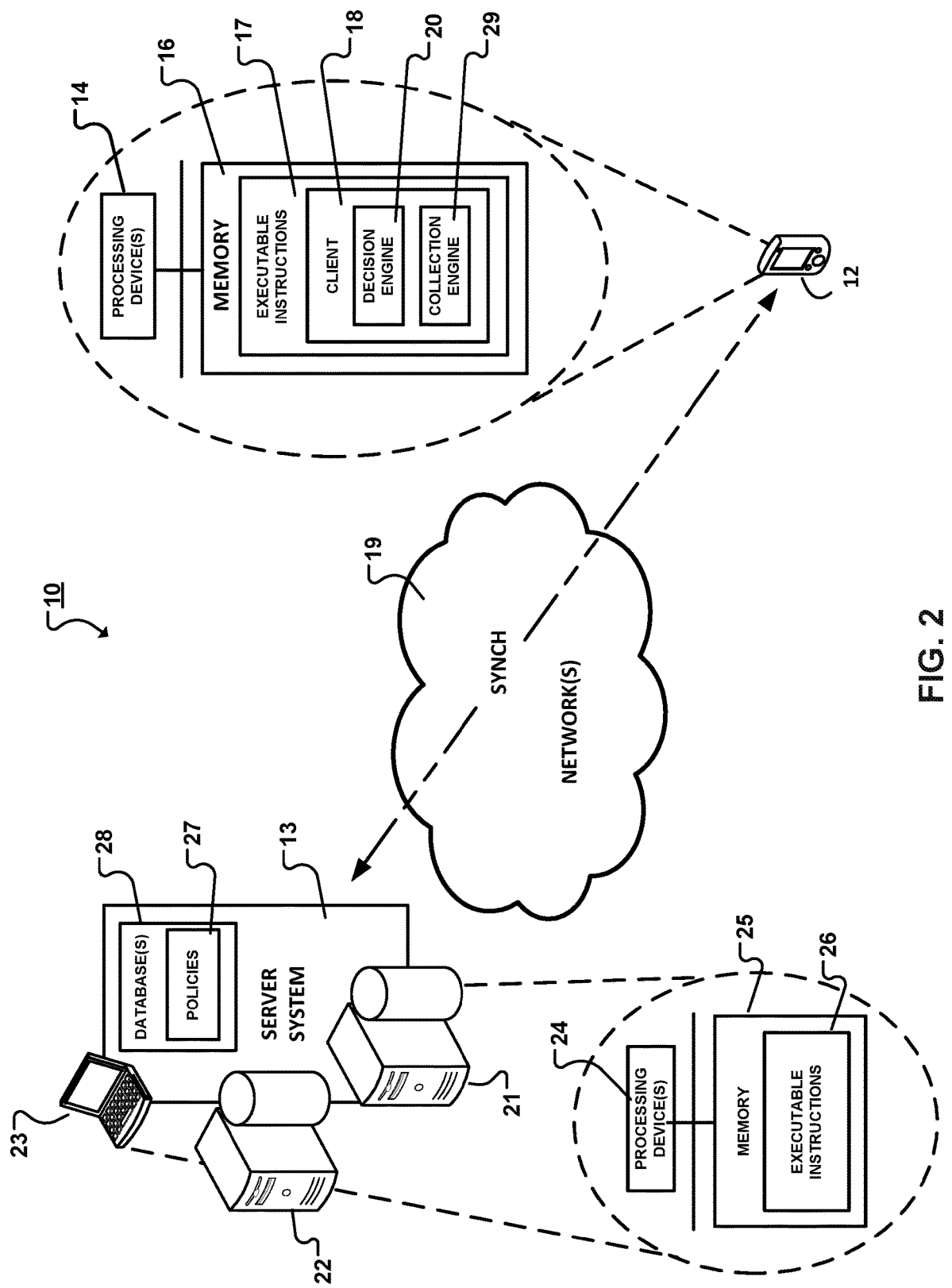
FIG. 2 is a block diagram of an example computer/network architecture on which the example processes described herein may be implemented.

FIG. 2 shows an example computer/network architecture 10 on which the example processes for selecting and switching among different frequency bands may be implemented. The processes, however, are not limited to use with the architecture of FIG. 2, and may be implemented on any appropriate computer architecture and/or network architecture.

In FIG. 2, example computer/network architecture 10 includes a mobile device 12 and a server system 13. Mobile device 12 may be the same as mobile device 3 of FIG. 1 or different. In this regard, the mobile device may be, or include, any appropriate device capable of communicating over a computer network including, but not limited to, a smartphone, a cellular telephone, a digital camera, a tablet computing device, a laptop computer, and so forth. Mobile device 12 may include one or more processing devices 14 (e.g., microprocessors) and memory 16 storing computer/machine-executable instructions 17 that are executable by the one or more processing devices. The instructions may be part of one or more computer programs that implement a client 18 that controls all or part of frequency band selecting and switching functionality described herein. In some implementations, the client may include a decision engine 20 that determines whether to connect to a wireless network, and that implements the processes described herein. In some implementations, the client may also include a collection engine 29, which obtains, e.g., network attributes, device attributes, or both network and device attributes, and provides those attributes to the decision engine for use in determining which frequency band to use for connection to a wireless network. In some implementations, the decision engine and the collection engine include functionality other than that described herein. In some implementations, mobile device 12 may be connected to, and accessible over, any appropriate network 19, such as a WiFi network, an LTE (long-term evolution) network, and so forth.

In some implementations, the decision engine employs voting modules to evaluate a candidate network for connection to a mobile device based on network attributes, device attributes, or both network and device attributes. In some implementations, each voting module casts a vote indicating whether or not to connect the mobile device to the candidate network. The votes may be used to determine whether to connect to the candidate network. Votes may be based on whether a network attribute, such as those described herein, meet a predefined baseline. In some implementations, the votes may be evaluated numerically, qualitatively, or in other appropriate ways. In some implementations, the processes described herein for selecting, and switching among, frequency bands may be implemented by the decision engine after it is determined to connect to a wireless network and repeated, when appropriate, for a duration of the connection. In some implementations, a frequency band may be one of the attributes evaluated to determine if connection is to a wireless network is approved.

Server system 13 may include one or more computing devices 21, 22, 23 examples of which may include one or more servers, desktop computers, mobile devices, and so forth. An example server system may include one or more processing devices 24 (e.g., microprocessors) and memory 25 storing instructions 26 that are executable by the one or more processing devices. The instructions are part of one or more computer programs that may be used to implement at least part of the processes described herein. For example, the instructions may enable communication between the mobile device and the server system in order to provide the client on the mobile device with policies 27 that control the device's operation, including to implement the frequency band selection and switching processes described herein. These policies may be stored in a database 28 on the server system or at any other appropriate location that is accessible to the server system. Server system 12 may also be connected to, and accessible over, a wired or wireless network 19. In some implementations, the processes may not use the server system, but rather may be implemented solely on the mobile device. For example, policies may be pre-installed on the mobile device, or a user of the mobile device may program the mobile device with one or more appropriate policies.

Mobile device 12 and server system 13 may communicate with each other, and with other systems, such as those described herein, over one or more computer networks 19, which may include wireless and/or wired networks.

Figure 3:
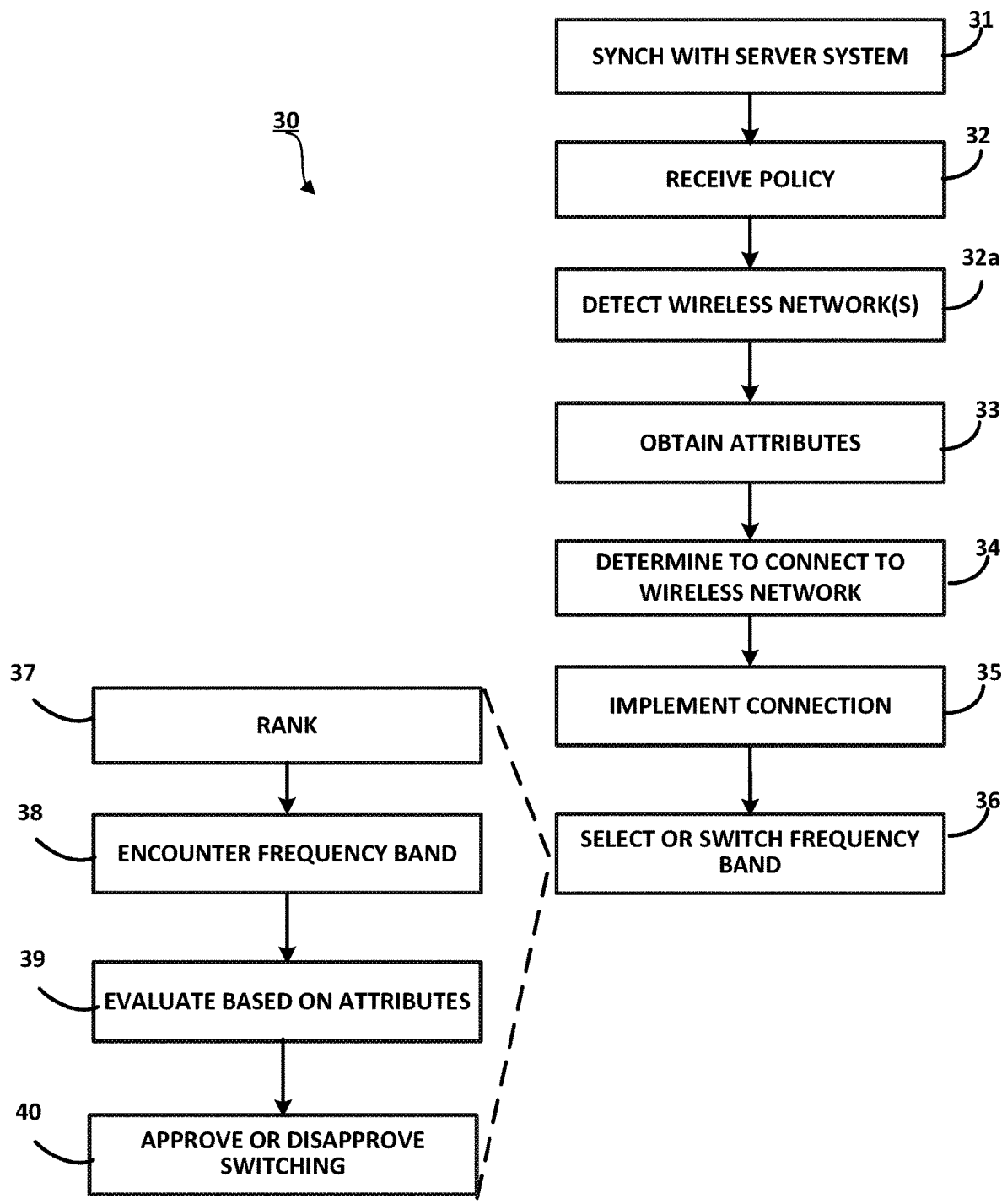
FIG. 3 is a flowchart showing an example process for switching connections over frequency bands of one or more wireless networks.

FIG. 3 shows an example process 30 for selecting, and switching among, frequency bands of one or more wireless networks. Process 30 may be performed by client 18 in whole, or in part, on the architecture of FIG. 3. According to process 30, client 18 in mobile device 12 synchs (31) with server system 13 over one or more computer networks 19. As explained, during this synchronization, a policy may be pushed by the server system to the client, or the client may request and receive the policy from the server system. In any case, the client receives (32) the policy from the server system. The policy specifies, among other things, the conditions under which a device may select, or switch, frequency bands of a wireless network or may select, or switch, frequency bands of two or more wireless networks. As explained above, selecting or switching may take into account the frequencies of the band alone or in combination with one or other attributes.

As noted, examples of attributes that may be considered during selecting and switching include, but are not limited to: ranges of coverage of the frequency bands, throughput attainable on the frequency bands, the number of channels of each frequency band, the device's ability or inability to connect over the certain frequency bands, quality of service (QoS) achievable over the different frequency bands, network latency over the different frequency bands, network security on different frequency bands, a preference of the device for particular frequency band(s), the number of users on a particular frequency band, the signal strength of the frequency bands, signal-to-noise ratio (SNR) associated with the frequency bands, levels of radio frequency (RF) background signals, other radiation in the area, physical barriers or obstacles in the area, and so forth. As appropriate, multiple policies may be programmed into the client and used as described herein.

In some implementations, the client may configure the decision engine based on one or more received policies so that the decision engine determines whether, when, and under what circumstances to select or switch among frequency bands in a connection to a wireless network or networks. The policy also may include how often to scan for wireless networks in order to identify a wireless network. In this regard, a mobility state of the device corresponds to an amount of motion experienced by the mobile device. For example, the mobility state may be characterized by a speed or velocity of the device. In some implementations, the mobility state may be a factor in determining whether a connection may be made to a wireless network. For example, In some implementations, the mobility state of a device affects how aggressively the device switches between wireless networks. To this point, the mobility state of a device may affect how often scanning for new networks is performed by the client, which may affect how often the voting modules evaluate attributes. For example, more aggressive switching may require more frequent scanning, whereas less aggressive switching may require less frequent scanning. Based on this information, the client 18 scans for, and detects (32a) a wireless network that is in-range of the mobile device. In some implementations, more than one wireless network that is in-range may be detected.

In some implementations, a policy may direct the client to configure the decision engine so that the decision engine determines whether to switch between frequency bands based on signal strength over those frequency bands. For example, as explained herein, at farther locations from a network access point, network signal strength in different frequency bands may vary. For example, signals in a 2.4 GHz band will travel farther and, therefore, be stronger, at points farther from the network access point than signals in the 5 GHz frequency band or the 60 GHz frequency band. Likewise, signals in the 5 GHz band will travel farther and, therefore, be stronger, at points farther from the network access point than signals in the 60 GHz frequency band. At some locations, signals in two or more frequency bands will be discernable. For example, at some points, it may be possible to connect over the 2.4 GHz band or the 5 GHz band, or over the 2.4 GHz band, the 5 GHz band, or the 60 Ghz band. In some implementations, the policy may direct the decision engine to determine the signal strength over the different frequency bands, and to select a frequency band for connection that meets one or more predefined criteria. For example, the signal strength of each band may be compared to a baseline. The policy may direct the decision engine to select the greatest frequency band whose signal strength exceeds the baseline. For example, if the signal strength over the 2.4 Ghz band and the 5 GHz band both exceed the baseline, the decision engine may be configured to select the 5 GHz band for connection, since the 5 GHz band provides benefits, such as greater throughput, that the 2.4 GHz band does not provide. In another example, decision engine may be configured to connect over whichever frequency band provides the strongest signal. In an example, the signal strength over the 2.4 GHz band, the 5 GHz band, and the 60 GHz band may be compared to each other. Whichever frequency band provides the greatest signal strength will be selected for connection to the wireless network. These operations may be performed for more than three frequency bands, and for frequency bands other than 2.4 GHz, 5 GHz, and 60 GHz.

In some implementations, a policy may direct the client to configure the decision engine so that the decision engine determines whether to switch between frequency bands based on the signal-to-noise (SNR) ratio over those frequency bands. For example, as explained herein, background radiation, other wireless signals, obstacles, or other factors may affect signal quality in a particular area. Furthermore, at some locations, signals in two or more frequency bands will be discernable. For example, at some points, it may be possible to connect over the 2.4 GHz band or the 5 GHz band, or over the 2.4 GHz band, the 5 GHz band, or the 60 Ghz band. In some implementations, the policy may direct the decision engine to determine the SNR over each discernable frequency band, and to select a frequency band for connection that meets one or more predefined criteria. For example, the SNR of each band may be compared to a baseline. The policy may direct the decision engine to select the greatest frequency band whose SNR is below the baseline, e.g., the signal that has less, or the least, noise relative to the signal. For example, if the SNR over the 2.4 Ghz band and the 5 GHz are both below the baseline, the decision engine may be configured to select the 5 GHz band for connection, since the 5 GHz band provides benefits, such as greater throughput, that the 2.4 GHz band does not provide. In another example, decision engine may be configured to connect over whichever frequency band provides the lowest SNR. In an example, the SNR over the 2.4 GHz band, the 5 GHz band, and the 60 GHz band may be compared to each other. Whichever frequency band provides the lowest SNR will be selected for connection to the wireless network. These operations may be performed for more than three frequency bands, and for frequency bands other than 2.4 GHz, 5 GHz, and 60 GHz.

Client 12 obtains (33) attributes relating to the device, to the detected wireless network or networks, or to both the device and the detected network(s). Although FIG. 3 shows the attributes being obtained before connection, that is not a requirement. Rather, the attributes may be obtained at any appropriate time, including before, during, and after connection to the wireless network. In some implementations, as noted, a collection engine 29 obtains the attributes. For example, the attributes relating to the device may be obtained from the device itself or from a device profile obtained from the server system at the time a policy is obtained. In some implementations, the attributes relating to the detected network(s) may be obtained from the networks through measurement (e.g., by sending and receiving test packets) over the network in a case where there is a current connection to the network that enables these operations. In some implementations, the attributes relating to the device, to the wireless networks, or to both the device and the wireless networks may be obtained by monitoring the device over time. Examples of the attributes are listed previously. As noted, the listing of attributes provided herein is not exhaustive. Any appropriate attributes may be used to decide over which frequency band to connect to a network.

In some implementations, the attributes relate to one or more wireless networks that is/are also in-range of the mobile device other than a detected network. Attributes relating to these other wireless networks may be used, where appropriate, to evaluate whether frequency bands of those other networks are better candidates for the mobile device than a frequency band of the detected network. Attributes relating to these other wireless networks also may be taken into account to the extent that those other wireless networks affect connection between the mobile device and the detected wireless network, or transfer of data between the mobile device and the detected wireless network. In this regard, FIG. 4 (described below) shows an example in which a mobile device is controlled to switch between frequency bands on different WiFi networks to improve performance.

Client 18 determines (34) to connect to the wireless network, and thereafter controls (35) the device to implement the network connection. As explained above, the decision to connect may be determined by voting modules that evaluate a candidate network for connection to a mobile device based on network attributes, device attributes, or both network and device attributes, such as attributes similar to those described herein. In an example, each voting module casts a vote indicating whether or not to connect the mobile device to the detected wireless network. The votes are evaluated to determine whether to connect to the candidate network. In this regard, following a decision to connect to a wireless network, the client attempts to make the connection. However, not all attempts may be successful for a variety of reasons. In some implementations, the device connects to the wireless network over the first frequency band that the device encounters. If multiple frequency bands are encountered, the client may evaluate which of those frequency bands provides the best level of service using the processes described herein, and may control the device to connect over that frequency band first, and potentially switch among frequency bands as levels of service among the frequency bands change.

During or after connection, process 30 includes controlling the device to select, or switch, (36) frequency bands. As explained herein, wireless connection may be implemented over an initial frequency band, and the frequency band used for connection may be changed as new frequency bands are encountered. As also explained, the change in frequency bands may be based on a policy programmed into a client which may, e.g., control changes to frequency bands based solely on frequency or based on frequency in combination with one or more attributes, such as those described herein, to improve device performance. In some implementations, the connections may be switched in real-time, and the switching processes may be implemented so as to reduce (e.g., minimize) their effects on a user. For example, if the user is downloading a large file, the processes may wait until that file download is complete before implementing the switching.

In some implementations, selecting and switching frequency bands may include ranking (37) frequency bands and wireless networks containing those frequency bands, and controlling the switching based on the rankings. For example, the client may determine, or predict, beforehand the different levels of service resulting from connection to the wireless network over different frequency bands, and prioritize connection over those frequency bands based on their determined levels of service. In controlling the device to select, or to switch, frequency bands, the client may start with the highest-ranked frequency band on the list and move down the list until a frequency band of a wireless network in-range is encountered, and attempt connection to the wireless network over that frequency band. If a connection cannot be made for any reason, the client may move to the next, lower-ranked frequency band on the list in attempt connection. This process may continue until a connection is made or until there are no additional frequency bands or networks to consider. In examples where there is only one wireless network and frequency band in-range, the mobile device may connect to that wireless network and frequency range, and reevaluate the list upon encountering additional frequency bands, wireless networks, or both frequency bands and wireless networks.

In some implementations, selecting and switching frequency bands may include encountering (38) a new frequency band and identifying where the new frequency band is in the ranking. If the new frequency band is above the band currently in use for connection, the process includes evaluating (39) the new frequency band based on one or more of attributes, such as those described herein, and approving or disapproving (40) switching of the device to the new frequency band based on the evaluation. For example, if the new frequency band is a higher-frequency band and/or provides a better level of service, switching may be approved. If the switching is approved, an attempt is made to connect over the new frequency band. If switching is disapproved, no action is taken. Similar operations may be performed for selecting an initial band for connection.

Figure 4:
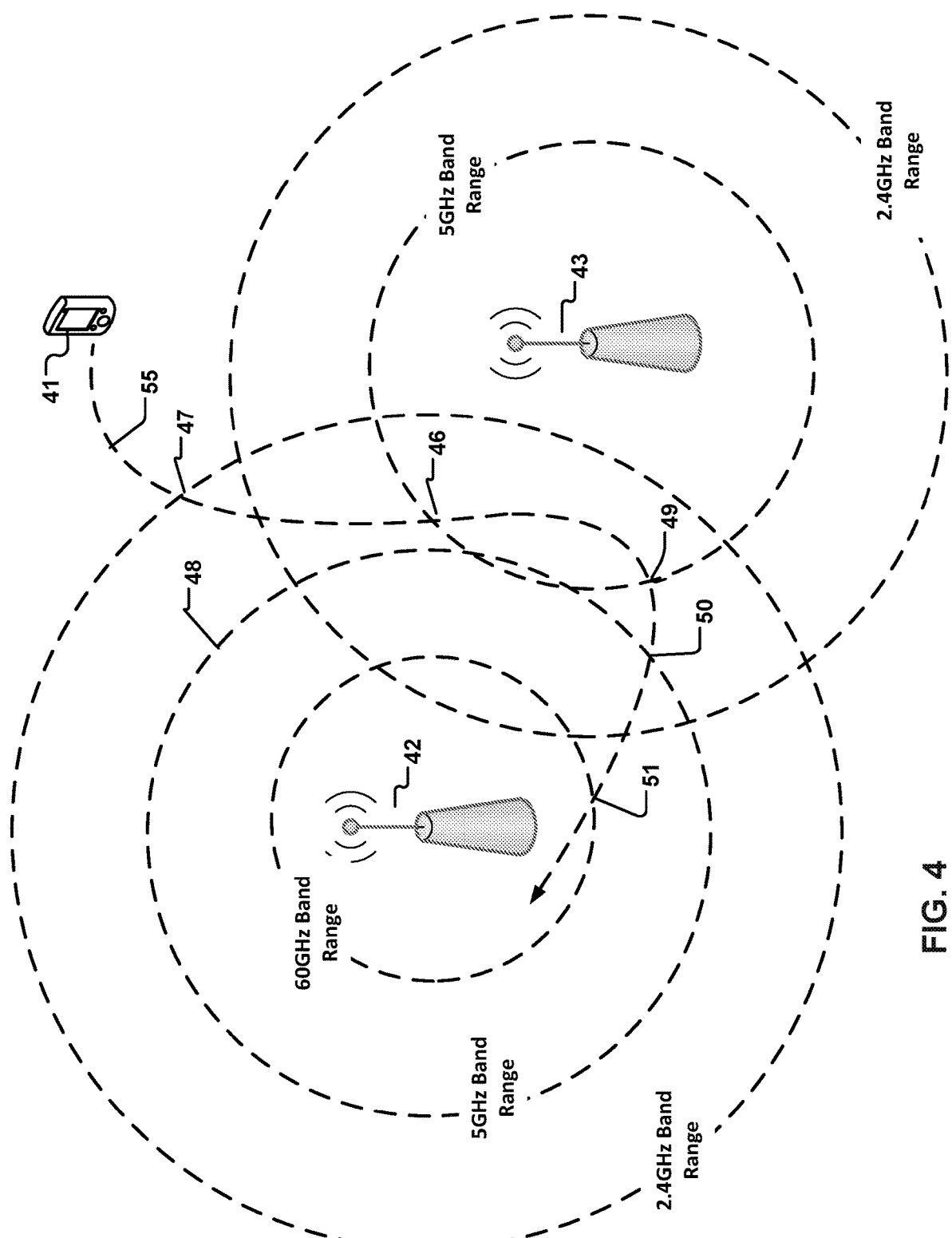
FIG. 4 is a block diagram showing an example where frequency band connections are switched during movement through two different wireless networks.

In some implementations, controlling the device to select, or to switch, (36) connections over one frequency band to another frequency band may include severing an existing connection over one frequency band (e.g., 2.4 GHz); connecting to the wireless network over a new frequency band (e.g., 5 GHz); and eventually again connecting to the wireless network over the original frequency band (e.g., 2.4 GHz). This example is described above with respect to FIG. 1, and may be generalized to include any appropriate sequential connections to increasing-frequency bands followed by any appropriate sequential connections to decreasing-frequency bands, e.g., connect over a 2.4 GHz band; sever the connection over the 2.4 GHz band and connect over a 5 GHz band; sever the connection over the 5 GHz band and connect over a 60 GHz band; sever the connection over the 60 GHz band and connect over a 5 GHz band; and sever the connection over the 5 GHz band and connect over the 2.4 GHz band. This example may be generalized to include non-sequential connections. For example, in some cases, non-sequential connection may be more advantageous from a service standpoint than sequential connections. For example, a connection sequence may include: connect over a 2.4 GHz band; sever the connection over the 2.4 GHz band and connect over a 5 GHz band; sever the connection over the 5 GHz band and connect again over the 2.4 GHz band; sever the connection over the 2.4 GHz band and connect over a 60 GHz band; and sever the connection over the 60 GHz band and connect over the 5 GHz band. Physical barriers of obstacles such as walls, electromagnetic shielding, or environmental radiation may impact which bands provide the best level of service and, therefore, which connections to make and in which sequence. FIG. 4 below shows an example of non-sequential connections involving two wireless networks.

Referring back to the example of FIG. 1, as a device 3 moves relative to and within the range of the wireless network, e.g., from point 7a to point 7b in area 8, the device encounters two different frequency bands of the wireless network. At each point 7a and 7b, client 18 may control device 3 to switch (36) connections among different ones of the two frequency bands based on levels of service provided by the different frequency bands. In some implementations, client 18 may control the device to maintain an existing network connection on a frequency band based on constraints defined in one or more policies. For example, if switching from one frequency band (e.g., 2.4 GHz) to another frequency band (e.g., 5 GHz) will negatively impact one or more attributes, such as throughput, latency, or others listed herein, the client may control the device so as not to implement the switch. For example, if the throughput for the 5 GHz frequency band does not meet a predefined baseline, or will not result in a percentage improvement over the 2.4 GHz band improvement, switching may not be performed. An example of a baseline is a threshold, a combination of thresholds, a range, or any other appropriate information against which to evaluate (e.g., to compare) one or more values, such as attribute values The policy or policies programmed into the client may dictate the circumstances under which frequency bands are to be switched or not to be switched when new frequency bands are encountered.

As noted, in some implementations, the processes described herein may be used to connect over different frequency bands of two or more different wireless networks. In the example of FIG. 4, a mobile device 41 may move in the direction of arrow 55. During movement, the mobile device 41 may first connect over a 2.4 GHz band of WiFi network 42 at point 47. But, during movement, the mobile device may first encounter a 5 GHz band of WiFi network 43 at point 46 before encountering the 5 GHz band of WiFi network 42 at range 48. In this example, assuming there is not a significant different in performance over the two networks 42 and 43 and connection to a new WiFi network is approved through the voting mechanism, the device may be controlled to disconnect from the 2.4 GHz band of WiFi network 42, and then to connect over the 5 GHz band of WiFi network 43. As the device 41 moves, it may then connect over the 2.4 GHz band of WiFi network 42 at point 49 and then the 5 GHz band of WiFi network 42 at point 50, and then to the 60 GHz band of WiFi network 42 at point 51, and so forth, in order to achieve the best performance based on the availability of WiFi networks and frequency bands over which to connect to the WiFi networks. As each connection is made, the prior connection may be severed. In some cases, if performance will suffer due to a switch, then the switch may not be made. This example may be generalized such that switching frequency bands may be implemented among more than two wireless networks and may involve any appropriate number of wireless networks, frequency bands, and channels. When switching between wireless networks in order to connect over a desired frequency band, the voting mechanism described herein may, or may not, be employed to approve or deny the switch between wireless networks.

In some implementations, the location of the mobile device relative to the network access point may affect connection over a particular frequency band. For example, as noted, a 2.4 GHz signal propagates farther in space than a 5 GHz signal, which propagates farther in space than a 60 GHz signal. If a mobile device is relatively far away from a network access point from which these signals emanate then, based on attributes or other factors, the device will most likely connect over the 2.4 GHz band. If the device is relatively closer to the network access point from which these signals emanate and within range of the 5 GHz band, based on attributes or other factors, the device will most likely connect over the 5 GHz band. If the device is relatively still closer to the network access point from which these signals emanate and within range of the 60 GHz band, based on attributes or other factors, the device will most likely connect over the 60 GHz band. Barriers or obstacles may have the greatest effect on propagation of higher-frequency signals. For example, a physical barrier that prevents propagation of a 60 GHz signal may allow a 5 GHz signal and a 2.4 GHz signal to pass, and a physical barrier that prevents propagation of a 60 GHz signal and a 5 GHz signal may allow a 2.4 GHz signal to pass. Accordingly, location of the mobile device relative to the network access point and intervening physical barriers or obstacles also impact to which frequency band of a wireless network a mobile device may connect.

The processes have been described in the context of WiFi networks; however, the processes may be used with any appropriate wireless network or networks. Examples of such other networks include, but are not limited to, cellular networks, such LTE networks, 3G networks, and 4G networks, Internet-of-Things (IoT) networks, local area networks (LANs), wide area networks (WANs), or any appropriate combination of wireless networks. In this regard, the processes may be applied to switch frequency bands between the same type, or between different types, of wireless networks.

The processes may be used with both managed and unmanaged wireless networks. In some examples, to operate on a managed network, the client obtains device security credentials along with a policy. Examples include, but are not limited to, a username and password. This information is provided to the wireless network during connection operations. In some examples, to operate on an unmanaged network, the device itself knows the security credentials, e.g., the security credentials are not provided by the server system along with the policies. This information is provided to the wireless network during connection operations.

Although the processes are described herein in the context of wireless networks, the processes may be used, where appropriate, to switch among frequency bands of wired networks or outside of a network context. For example, the processes may be used to switch among different frequencies on a digital subscriber line (DSL), although movement may not be a factor in this example.

Although the processes are described herein in the context of a wireless device moving through a stationary network, the processes are equally applicable for cases where the network access point is moving and the mobile device is either stationary or also moving. Relative motion between the network and the device causes the device to encounter different frequency bands, and may cause the processes described herein to implement frequency band switching.

Computing systems that may be used to implement all or part of the server system described herein may include various forms of digital computers. Examples of digital computers include, but are not limited to, laptops, desktops, workstations, personal digital assistants, servers, blade servers, mainframes, and other appropriate computers. Computing systems may be part of, included in, or used to implement all or part of the mobile devices described herein. Examples of mobile devices include, but are not limited to, tablet computing devices, personal digital assistants, cellular telephones, smartphones, digital cameras, digital glasses and other portable computing devices. The computing devices described herein, their connections and relationships, and their functions, are meant to be examples only, and are not meant to limit implementations of the technology.

All or part of the processes described herein and their various modifications (hereinafter referred to as "the processes") can be implemented, at least in part, via a computer program product, e.g., a computer program tangibly embodied in one or more information carriers, e.g., in one or more tangible machine-readable storage media, for execution by, or to control the operation of, data processing apparatus, e.g., a programmable processor, a computer, or multiple computers A computer program can be written in any form of programming language, including compiled or interpreted languages, and it can be deployed in any form, including as a stand-alone program or as a module, part, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Non-transitory machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Each computing device, such as a smartphone or server, may include a hard drive for storing data and computer programs, and a processing device (e.g., a microprocessor) and memory (e.g., RAM) for executing computer programs.

A computing device may include a graphics system, including a display screen. A display screen, such as an LCD or a CRT (Cathode Ray Tube) displays, to a user, images that are generated by the graphics system of the computing device. As is well known, display on a computer display (e.g., a monitor) physically transforms the computer display. For example, if the computer display is LCD-based, the orientation of liquid crystals can be changed by the application of biasing voltages in a physical transformation that is visually apparent to the user. As another example, if the computer display is a CRT, the state of a fluorescent screen can be changed by the impact of electrons in a physical transformation that is also visually apparent. Each display screen may be touch-sensitive, allowing a user to enter information onto the display screen via a virtual keyboard. On some computing devices, such as a desktop or smartphone, a physical QWERTY keyboard and scroll wheel may be provided for entering information onto the display screen. A computing device, and computer programs executed thereon, may also be configured to accept voice commands, and to perform functions in response to such commands. For example, the example processes described herein may be initiated at a client, to the extent possible, via voice commands.

Elements of different implementations described herein may be combined to form other implementations not specifically set forth above. Elements may be left out of the processes, computer programs, interfaces, etc. described herein without adversely affecting their operation or the operation of the system in general. Furthermore, various separate elements may be combined into one or more individual elements to perform the functions described herein.

Other implementations not specifically described herein are also within the scope of the following claims.

What is claimed is:

1. A computerized method for operating a millimeter wave (mmWave)-enabled wireless user device within a wireless network comprising at least one wireless access node, the computerized method comprising:
    detecting one or more wireless networks in range of the mmWave-enabled wireless user device, the one or more wireless networks supporting connection over at least two frequency bands;
    controlling the mmWave-enabled wireless user device to connect to a first one of the one or more wireless networks over a first one of the at least two frequency bands, wherein the controlling of the mmWave-enabled wireless user device to connect to the first one of the one or more wireless networks over the first one of the at least two frequency bands is based on based at least on a physical distance of the mmWave-enabled wireless user device relative to the at least one wireless access node; and
    controlling the mmWave-enabled wireless user device to switch over to a second one of the at least two frequency bands based at least on one or more levels of service provided by the second one of the at least two frequency bands, wherein the controlling of the mmWave-enabled wireless user device to switch over to the second one of the at least two frequency bands is based on movement of the at least one wireless access node such that a physical distance of the mmWave-enabled wireless user device relative to at least one second wireless access node associated with the second one of the at least two frequency bands is shorter than the physical distance of the mmWave-enabled wireless user device relative to the at least one wireless access node.

2. The computerized method of claim 1, wherein the controlling of the mmWave-enabled wireless user device to switch over to the second one of the at least two frequency bands based at least on the one or more levels of service provided by the second one of the at least two frequency bands, comprises controlling of the mmWave-enabled wireless user device to switch over to the second one of the at least two frequency bands based at least on an availability of one or more services over one or more mmWave frequency bands.

3. The computerized method of claim 1, wherein the at least one wireless access node comprises an air interface compliant with a 3GPP (Third Generation Partnership Project) Long Term Evolution (LTE) standard.

4. The computerized method of claim 1, wherein the controlling the mmWave-enabled wireless user device to switch over to the second one of the at least two frequency bands based at least on the one or more levels of service provided by the second one of the at least two frequency bands comprises:
    causing the mmWave-enabled wireless user device to predict, beforehand, at least one levels of service resulting from connection to the wireless network over at least the second one of the at least two frequency bands; and
    cause the switch over to the second one of the at least two frequency bands based at least on the predicted level of service associated with the second one of the at least two frequency bands meeting a prescribed criterion.

5. The computerized method of claim 1, further comprising determining at least one mobility state of the mmWave-enabled wireless user device;
    wherein the controlling the mmWave-enabled wireless user device to switch over to the second one of the at least two frequency bands further comprises utilizing the at least one mobility state to determine whether to perform the switch over.

6. The computerized method of claim 1, further comprising:
    determining at least one mobility state of the mmWave-enabled wireless user device; and
    based at least in part on the at least one mobility state, determining that a connection to the one or more wireless networks via the second one of the frequency bands can be made;
    wherein the controlling the mmWave-enabled wireless user device to switch over to the second one of the at least two frequency bands further comprises utilizing the determination that the connection can be made as part of the controlling the switch over.

7. The computerized method of claim 1, wherein:
    (i) the first one of the at least two frequency bands comprises a non-mmWave frequency band, and the second one of the at least two frequency bands comprises a mmWave frequency band;

(ii) the computerized method further comprises:
   determining first and second signal strengths via the mmWave-enabled wireless user device, the first and second signal strengths relating to the non-mmWave and the mmWave frequency bands, respectively; and
   determining, based at least one the determined first and second signal strengths, that each of the non-mmWave frequency band or the mmWave frequency band may be used for connection of the mmWave-enabled wireless user device to the one or more wireless networks; and
(iii) the controlling the mmWave-enabled wireless user device to switch over to the second one of the at least two frequency bands comprises utilizing the determination that each of the non-mmWave frequency band or the mmWave frequency band may be used for connection in selecting the mmWave frequency band, and cause the switch over.

8. The computerized method of claim 7, wherein the utilizing the determination that each of the non-mmWave frequency band or the mmWave frequency band may be used for the connection in selecting the mmWave frequency band further comprises determining that the mmWave frequency band has a higher data throughput than the non-mmWave frequency band.

9. The computerized method of claim 1, further comprising determining at least one signal strength via the mmWave-enabled wireless user device;
   wherein the controlling of the mmWave-enabled wireless user device to switch over to the second one of the at least two frequency bands further comprises utilizing the at least one signal strength to determine that the switch over should be performed.

10. A computerized user device configured to operate within a wireless network architecture supporting both millimeter wave (mmWave) and non-mmWave frequency bands, the computerized user device comprising:
   processor apparatus;
   at least one wireless interface in data communication with the processor apparatus, the at least one wireless interface comprising a mmWave capable wireless interface capable of operation via a mmWave frequency band and a second interface capable of operation via a non-mmWave frequency band; and
   a storage device in data communication with the processor apparatus and comprising a storage medium configured to store at least one computer program, the at least one computer program configured to, when executed on the processor apparatus, enable the computerized user device to:
      detect one or more wireless nodes of the wireless network architecture, wherein at least a first one of the one or more wireless nodes is configured to support connection over the mmWave frequency band, and at least a second one of the one or more wireless nodes is configured to support connection over the non-mmWave frequency band;
      access data relating to one or more policies, the one or more policies comprising data relating to utilization by the computerized user device of the mmWave and non-mmWave frequency bands;
      using at least the data relating to the one or more policies, perform an evaluation of whether to connect to the one or more wireless nodes using the mmWave frequency band or the non-mmWave frequency band;
      based at least on the evaluation, select the mmWave frequency band for connection;
      after the selection of the mmWave frequency band for connection, determine that the computerized user device with is no longer within a wireless range of the first one of the one or more wireless nodes configured to support the connection over the mmWave frequency band; and
      based at least on the determination and the data relating to the one or more policies, switch connection from the first one of the one or more wireless nodes to the second one of the one or more wireless nodes configured to support connection over the non-mmWave frequency band.

11. The computerized user device of claim 10, wherein the evaluation comprises performance of at least one prediction of a service level associated with connection to the one or more wireless nodes using the mmWave frequency band.

12. The computerized user device of claim 10, wherein the evaluation comprises:
   determination that signal strengths associated with each of the mmWave frequency band and the non-mmWave frequency band, respectively, satisfy one or more criteria for connection using that respective band; and
   based at least in part on the determination, identify the mmWave frequency band as having a higher priority of selection than the non-mmWave frequency band.

13. The computerized user device of claim 12, wherein the identification of the mmWave frequency band as having the higher priority is based at least in part on identification of a higher data throughput for the mmWave frequency band than for the non-mmWave frequency band.

14. The computerized user device of claim 12, wherein the identification of the mmWave frequency band as having the higher priority is based at least in part on the data relating to the one or more policies.

15. The computerized user device of claim 14, wherein the data relating to the one or more policies comprises data relating to at least one policy which specifies that when multiple frequency bands are detected and available for connection by the computerized user device, a frequency band having a highest frequency will be selected for use by the computerized user device.

16. A computer-readable apparatus comprising a non-transitory storage medium with at least one computer program stored thereon, the at least one computer program comprising a plurality of instructions configured to, when executed by a processing apparatus of a wireless-enabled client device configured for operation using each of at least one millimeter wave (mmWave) frequency band and at least one non-mmWave frequency band which is lower in frequency than the at least one mmWave frequency band, cause the wireless-enabled client device to:
   establish data communication with a network computerized process;
   receive policy data issued from the network computerized process via the established data communication, the policy data comprising data relating to utilization by the wireless-enabled client device of at least one of the at least one mmWave frequency band or the at least one non-mmWave frequency band;
   detect one or more wireless nodes of a first wireless network architecture, the one or more wireless nodes comprising a wireless node configured to support connection over the at least one non-mmWave frequency band but not the at least one mmWave frequency band;

connect, using the at least one non-mmWave frequency band, to the wireless node configured to support connection over the at least one non-mmWave frequency band;

thereafter, detect one or more second wireless nodes of a second wireless network architecture, the one or more second wireless nodes of the second wireless network architecture comprising a wireless node configured to support connection over the at least one mmWave frequency band;

based at least in part on the policy data, switch connection from the wireless node configured to support connection over the at least one non-mmWave frequency band, to the wireless node configured to support connection over the at least one mmWave frequency band;

after the switch of connection from the wireless node configured to support connection over the at least one non-mmWave frequency band, to the wireless node configured to support connection over the at least one mmWave frequency band, determine that the wireless-enabled client device with is no longer within a wireless range of the wireless node configured to support connection over the at least one mmWave frequency band; and based at least on the determination and the policy data, switch connection from the wireless node configured to support connection over the at least one mmWave frequency band, to the wireless node configured to support connection over the at least one non-mmWave frequency band.

17. The computer-readable apparatus of claim 16, wherein:

a second coverage area associated with the wireless node configured to support connection over the at least one mmWave frequency band at least partly overlaps with a first coverage area associated with the wireless node configured to support connection over the at least one non-mmWave frequency band; and the switch of connection from the wireless node configured to support connection over the at least one non-mmWave frequency band, to the wireless node configured to support connection over the at least one mmWave frequency band, and the switch of connection from the wireless node configured to support connection over the at least one mmWave frequency band, to the wireless node configured to support connection over the at least one non-mmWave frequency band, each occur as a result of movement of the wireless-enabled client device (i) from being within the first coverage area only to being within both the first and the second coverage areas, and (ii) from being within the first and the second coverage areas back into being within the first coverage area only, respectively.

18. A computer-readable apparatus comprising a non-transitory storage medium with at least one computer program stored thereon, the at least one computer program comprising a plurality of instructions configured to, when executed by a processing apparatus of a wireless-enabled client device configured for operation using each of at least one millimeter wave (mmWave) frequency band and at least one non-mmWave frequency band which is lower in frequency than the at least one mmWave frequency band, cause the wireless-enabled client device to:

establish data communication with a network computerized process;

receive policy data issued from the network computerized process via the established data communication, the policy data comprising data relating to utilization by the wireless-enabled client device of at least one of the at least one mmWave frequency band or the at least one non-mmWave frequency band;

detect one or more wireless nodes of a first wireless network architecture, the detected one or more wireless nodes comprising a wireless node configured to support connection over the at least one non-mmWave frequency band but not the at least one mmWave frequency band;

connect, using the at least one non-mmWave band, to the wireless node configured to support connection over the at least one non-mmWave frequency band;

thereafter, detect one or more wireless nodes of a second wireless network architecture, the detected one or more wireless nodes of the second wireless network architecture comprising a wireless node configured to support connection over the at least one mmWave frequency band; and based at least in part on the policy data, switch connection from the wireless node configured to support connection over the at least one non-mmWave frequency band, to the wireless node configured to support connection over the at least one mmWave frequency band;

wherein:
the first wireless network architecture comprises a managed cellular wireless network architecture, the second wireless network architecture comprises a managed non-cellular wireless Local Area Network (WLAN), and connection with each of the managed cellular wireless network architecture and the managed non-cellular WLAN requiring separate credentials;

the policy data is at least in part specific to the wireless-enabled client device; and receipt of the policy data includes receipt of at least a portion of the credentials required for at least one of the managed cellular wireless network architecture, or the managed non-cellular WLAN.

19. The computer-readable apparatus of claim 18, wherein at least one of (i) the one or more wireless nodes of the first wireless network architecture, or (ii) the one or more wireless nodes of the second wireless network architecture, comprise a node which is moving.

20. The computer-readable apparatus of claim 18, wherein the switch of the connection from the wireless node configured to support connection over the at least one non-mmWave frequency band, to the wireless node configured to support connection over the at least one mmWave frequency band comprises an approval process, the approval process based at least on one or more votes cast by each of a plurality of computerized voting modules utilized by an application on the wireless-enabled client device.

* * * * *